(12) United States Patent
Fujimoto et al.

(10) Patent No.: US 9,915,230 B2
(45) Date of Patent: Mar. 13, 2018

(54) ENGINE SYSTEM (71) Applicant: Mazda Motor Corporation, Aki-gun, Hiroshima (JP)

(72) Inventors: Masahiko Fujimoto, Hiroshima (JP); Hiroyuki Yamashita, Hiroshima (JP); Keiji Araki, Hatsukaichi (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 15/297,896

(22) Filed: Oct. 19, 2016

(65) Prior Publication Data

US 2017/0138315 A1    May 18, 2017

(30) Foreign Application Priority Data

Nov. 12, 2015 (JP) ................. 2015-222422

(51) Int. Cl.
 *F02M 25/038* (2006.01)
 *F02B 47/02* (2006.01)
 *F02M 25/03* (2006.01)

(52) U.S. Cl.
 CPC ........... *F02M 25/038* (2013.01); *F02B 47/02* (2013.01); *F02M 25/03* (2013.01); *Y02T 10/121* (2013.01)

(58) Field of Classification Search
 CPC .. F02M 25/038; F02M 25/025; F02M 25/028; F02M 25/03; F02M 25/032; F02B 47/02; F02B 47/00
 See application file for complete search history.

(56) References Cited

U.S. PATENT DOCUMENTS

| 2004/0003781 | A1* | 1/2004 | Yuki | ........... F02B 47/02 123/25 C |
| 2006/0249102 | A1* | 11/2006 | Morgan | ......... F02B 47/02 123/25 J |

FOREIGN PATENT DOCUMENTS

JP       5045569 B2    10/2012

* cited by examiner

*Primary Examiner* — Jacob Amick
(74) *Attorney, Agent, or Firm* — Alleman Hall Creasman & Tuttle LLP (57) ABSTRACT

An engine system is provided that includes a cylinder, an exhaust flow part, a purifying system, a water injector for injecting supercritical/subcritical water into the cylinder, a water supply passage connected with the water injector and for supplying the water, a first temperature increasing device disposed at a position of the exhaust flow part and for increasing a water temperature, and a second temperature increasing device including a part of the exhaust flow part and a part of the water supply passage, and for increasing a water temperature. The first device increases the water temperature when an exhaust gas temperature passing through the position of the exhaust flow part exceeds a reference temperature. The second device increases the water temperature when an exhaust gas temperature passing through the part of the exhaust flow part is above a water temperature passing the part of the water supply passage.

7 Claims, 5 Drawing Sheets

FIG. 5

ENGINE SYSTEM

BACKGROUND

The present invention relates to an engine system, which includes a cylinder, an exhaust flow part where exhaust gas generated within the cylinder flows, and a purifying system provided to the exhaust flow part and for purifying the exhaust gas.

Conventionally, in engine systems, water is injected into cylinders in order to improve fuel efficiency, etc. In other words, by injecting water into the cylinders, the water, in addition to a combustion gas, is able to function as an operation gas to progress an expansion stroke. Thus, a combustion gas amount, furthermore an amount of fuel supplied into the cylinders can be reduced.

For example, JP5045569B discloses an engine system which includes a heat exchanger and a condenser provided at a position of an exhaust passage downstream of a purifying system in this order from the upstream side, condenses water within the exhaust gas in the exhaust passage by the condenser, increases this water in temperature by the heat exchanger using an energy of the exhaust gas, and then injects it into the cylinders. Thus, with this engine system, energy efficiency of the system as a whole can be improved.

For engine systems, in addition to an improvement in fuel efficiency, an improvement in exhaust emission performance is desired, and also purifying performance of a purifying system provided in an exhaust passage is desired to be kept high. In this regard, with the engine system of JP5045569B, the heat exchanger is provided at a position of the exhaust passage downstream of the purifying system, the exhaust gas discharged from the engine body flows into the purifying system as-is, and the temperature of the exhaust gas is not reduced by the heat exchanger until it passes through the purifying system. Therefore, when the exhaust gas at a high temperature is discharged from the engine body, the purifying system deteriorates due to the high-temperature exhaust gas and the purifying performance may degrade.

SUMMARY

The present invention is made in view of the above problems and aims to provide an engine system, which is capable of keeping a high purifying performance of a purifying system while improving energy efficiency of the engine system as a whole.

According to one aspect of the present invention, an engine system including a cylinder, an exhaust flow part where exhaust gas generated within the cylinder flows, and a purifying system provided to the exhaust flow part and for purifying the exhaust gas, is provided. The system includes a water injector for injecting one of supercritical water and subcritical water into the cylinder, a water supply passage connected with the water injector and for supplying the one of the supercritical water and the subcritical water to the water injector, a first temperature increasing device disposed at a position of the exhaust flow part and for increasing a temperature of water inside the water supply passage by using energy of the exhaust gas, and a second temperature increasing device including a part of the exhaust flow part and a part of the water supply passage, and for increasing a temperature of the water inside the water supply passage by using energy of the exhaust gas. The first temperature increasing device increases the temperature of the water inside the water supply passage when a temperature of the exhaust gas passing through the position of the exhaust flow part exceeds a reference temperature, the position of the first temperature increasing device being closer to the cylinder than the purifying system and the second temperature increasing device. The second temperature increasing device increases the temperature of the water inside the water supply passage when a temperature of the exhaust gas passing through the part of the exhaust flow part is above a temperature of the water passing through the part of the water supply passage.

According to the engine system of the present invention, the temperature of the water injected into the cylinder can stably be increased and a high purifying performance of the purifying system can be kept while improving energy efficiency of the engine system as a whole.

Specifically, with the engine system of the present invention, the first and second temperature increasing devices increase the temperature of the water inside the water supply passage by using the energy of the exhaust gas inside the exhaust passage, so as to generate the supercritical water or the subcritical water. The water is injected into the cylinder. Therefore, it is possible to convert the energy of the exhaust gas into an output of an engine via the water, which improves the energy efficiency of the engine system as a whole.

Further, with the engine system of the present invention, the first temperature increasing device increases the temperature of the water when the temperature of the exhaust gas passing through the position of the exhaust flow part is at a high temperature, which exceeds the reference temperature, and the second temperature increasing device increases the temperature of the water when the temperature of the exhaust gas passing through the part of the exhaust flow part is above the temperature of the water passing through the part of the water supply passage. Therefore, the water inside the water supply passage can be substantially constantly increased in temperature by the second temperature increasing device, and it is also possible to effectively increase the temperature of the water inside the water supply passage by the first temperature increasing device, using the exhaust gas which is above the reference temperature.

Additionally, with the engine system of the present invention, the first temperature increasing device is disposed at the position of the exhaust flow part, closer to the cylinder than the purifying system and the second temperature increasing device. Therefore, when the exhaust gas which is above the reference temperature is discharged from the cylinder, the first temperature increasing device can effectively increase the temperature of the water by using the high energy of the exhaust gas while suitably reducing the temperature of the exhaust gas which flows toward the purifying system. Further, when the temperature of the exhaust gas discharged from the cylinder is lower than the reference temperature, the exhaust gas can be flowed toward the purifying system without being decreased in temperature by the first temperature increasing device. Therefore, the temperature of the exhaust gas flowing toward the purifying system can be kept within a suitable range more reliably, resulting in keeping the high purifying performance.

In the above configuration, the first temperature increasing device may be a heat pipe accommodating a medium of which a boiling point is close to the reference temperature, and increases the temperature of the water inside the water supply passage via the medium.

Thus, with such a simple structure using the heat pipe, the temperature of the water inside the water supply passage can effectively be increased and the temperature of the exhaust gas passing downstream side of the exhaust flow part can be kept at a suitable temperature.

The reference temperature may be 600 K or above.

The system may further include a pump provided at a position of the water supply passage downstream of the second temperature increasing device, and for pumping water passing therethrough.

Thus, one of the supercritical water and the subcritical water can be generated from the water inside the water supply passage more reliably by being pressurized with the pump. Further the pump is provided at the position downstream of the second temperature increasing device, near the cylinder. Thus, it is possible to shorten the length of the piping for high pressure use, where the supercritical water or the subcritical water at high pressure is pumped into the cylinder.

The system may further include a condenser provided at a position of the exhaust flow part downstream of the second temperature increasing device, and for condensing water within the exhaust gas in the exhaust flow part. The water supply passage may supply the water condensed by the condenser to the water injector.

With the configuration, the water inside the exhaust flow part is used as the water injected into the cylinder. Therefore, there is no need to separately prepare water for the injection, which improves convenience. Further in the engine system, the condenser is provided at the position of the exhaust flow part downstream of the second temperature increasing device. The exhaust gas, after being decreased in temperature by the second temperature increasing device, flows into the condenser. Therefore, it is possible to efficiently condense the water by the condenser.

The system may further include a condensed water tank provided at a position of the water supply passage between the second temperature increasing device and the condenser, and for storing the condensed water, and a low-pressure pump provided at a position of the water supply passage between the condensed water tank and the second temperature increasing device, and for pumping the water inside the condensed tank to the second temperature increasing device.

Thus, the water can be stored in the condensed water tank, and this water can suitably be pumped to the water injector side by the low-pressure pump. It is possible to inject the suitable amount of water into the cylinder more reliably.

Further, in the above structure, the purifying system may be disposed at a position of the exhaust flow part upstream of the second temperature increasing device, so as to be adjacent thereto. The purifying system may be covered by a heat accumulation agent.

Thus, the exhaust gas before being cooled by the second temperature increasing device can be flowed into the purifying system so that the temperature of the purifying system is suitably kept high and produce thermal energy when, for example, purifying the exhaust gas by the purifying system, is effectively applied to the second temperature increasing device. As a result, the water can be effectively increased in temperature at the second temperature increasing device. Especially since the purifying system is covered by the heat accumulation agent, the temperature of the purifying system can be kept high more reliably and the thermal energy flowed into the second temperature increasing device can be increased to increase the temperature of the water more suitably.

DETAILED DESCRIPTION OF EMBODIMENT

Figure 1:
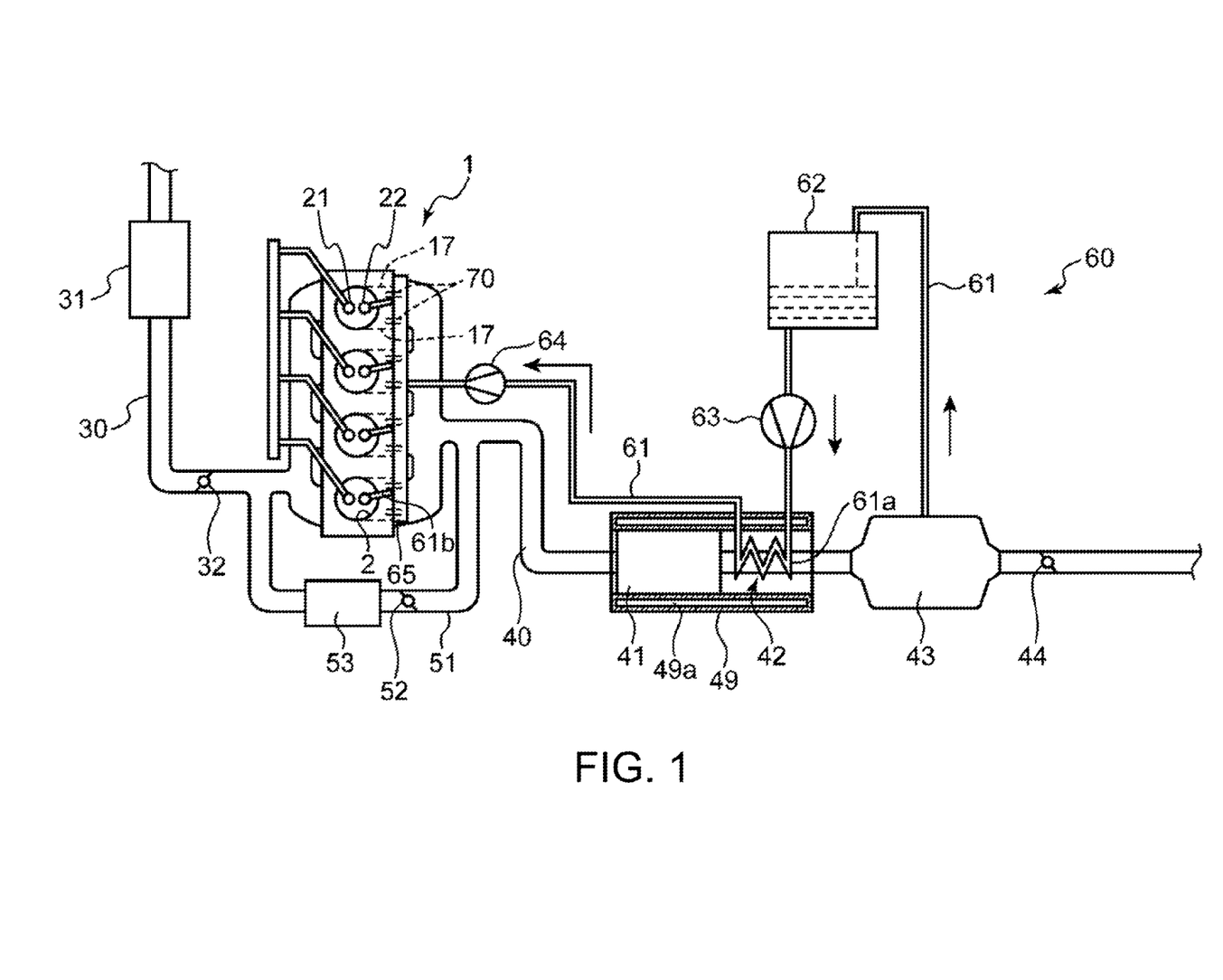
FIG. 1 is a view illustrating a structure of an engine system according to one embodiment of the present invention.

FIG. 1 is a view illustrating a structure of an engine system according to one embodiment of the present invention. The engine system of this embodiment includes an engine body 1 of a four stroke type, an intake passage 30 for introducing air for combustion into the engine body 1, an exhaust passage 40 for discharging exhaust gas generated in the engine body 1, and a water circulation device 60.

The engine body 1 is, for example, a four-cylinder engine having four cylinders 2. In this embodiment, the engine body 1 is driven by receiving fuel containing gasoline. The engine system of this embodiment is mounted on a vehicle, and the engine body 1 is used as a drive source of the vehicle.

(1) Engine Body

Figure 2:
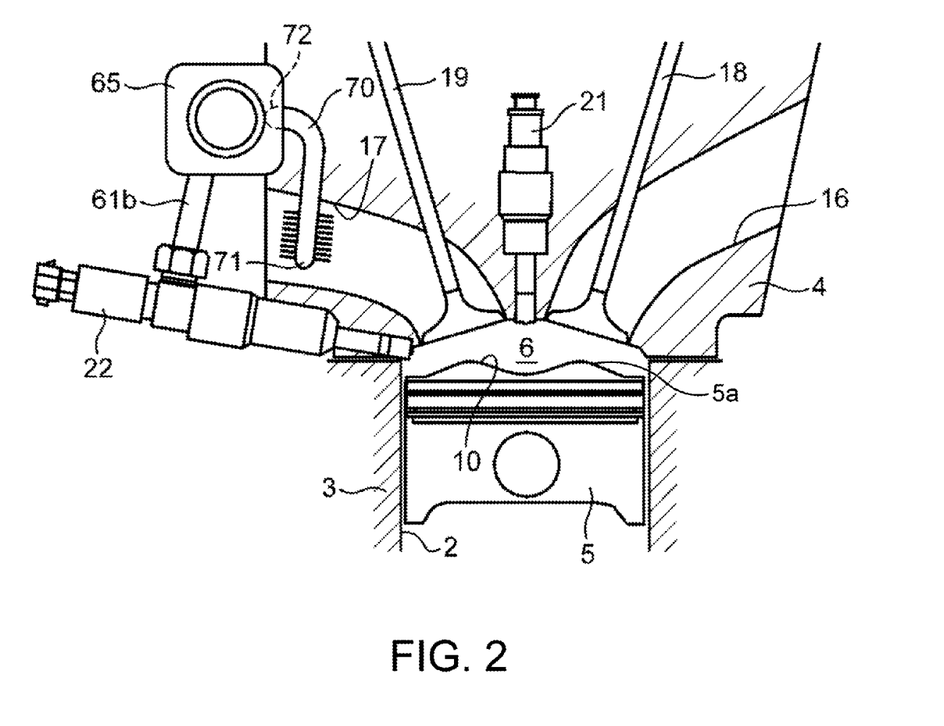
FIG. 2 is a schematic cross-sectional view of an engine body.

FIG. 2 is a schematic cross-sectional view of the engine body 1.

The engine body 1 includes a cylinder block 3 formed therein with the cylinders 2, a cylinder head 4 formed on the cylinder block 3, and pistons 5 fitted into the cylinders 2 to be reciprocatable (in up-and-down directions), respectively.

A combustion chamber 6 is formed above each piston 5. The combustion chamber 6 is a so-called pent-roof type, and a roof surface of the combustion chamber 6 (a bottom surface of the cylinder head 4) has a triangular roof shape formed by two inclining surfaces on an intake side and an exhaust side.

A crown surface 5a of the piston 5 has a cavity 10 formed by denting, to an opposite side from the cylinder head 4 (downward), an area including a center of the crown surface 5a. The cavity 10 is formed to have a volume corresponding to a major part of the combustion chamber 6 when the piston 5 is at a top dead center (TDC).

The cylinder head 4 is formed with intake ports 16 for introducing air supplied from the intake passage 30 into the cylinders 2 (combustion chambers 6), and exhaust ports 17 for guiding out the exhaust gas generated inside the cylinders 2 to the exhaust passage 40, respectively. In this embodiment, each cylinder 2 is formed with two intake ports 16 and two exhaust ports 17. The cylinder head 4 is further provided with intake valves 18 for opening and closing the intake ports 16 on the cylinder 2 side, and exhaust valves 19 for opening and closing the exhaust ports 17 on the cylinder 2 side, respectively.

Here, the exhaust flow part where the exhaust gas generated in the cylinders 2 flows, includes these exhaust ports 17 and the exhaust passage 40.

Each exhaust port 17 is attached with a heat pipe (first temperature increasing device) 70. In this embodiment, each exhaust port 17 is provided with one heat pipe 70, i.e., each cylinder 2 is provided with two heat pipes 70. The heat pipes 70 constitute a part of the water circulation device 60, and a detailed description thereof is given later.

Further, fuel injectors 21 for injecting the fuel into the cylinders 2, respectively, are provided to the cylinder head 4. Each fuel injector 21 is arranged so that its tip part is located near a center axis of the corresponding cylinder 2 and oriented toward a substantially center portion of the crown surface of the piston 5.

The fuel injector 21 injects fuel pumped from a fuel pump (not illustrated) into the cylinder 2. In this embodiment, a premixed charge compression self-ignition combustion is performed, in which the fuel and air are premixed to form a mixture gas and the mixture gas is compressed to self-ignite near the TDC on compression stroke (CTDC) throughout all operating ranges of the engine body. Accordingly, in the example of FIG. 2, ignition plugs for igniting the gas inside the cylinders 2 are not provided to the engine body 1; however, in a case where an additional ignition power is required for suitable combustion of the mixture gas in a cold start etc., the ignition plugs may suitably be provided to the engine body 1.

The fuel injector 21 injects into the cylinder 2 the fuel by an amount corresponding to an operating state of the engine body 1 at a corresponding timing thereto. For example, all the fuel is injected at once before the CTDC within an engine operating range where an engine load is comparatively low, and the fuel is split for three injections and injected into the cylinder 2 before the CTDC within an engine operating range where an engine load is comparatively high.

The cylinder head 4 is further provided with water injectors 22 for injecting supercritical water or subcritical water into the cylinders 2, respectively. As illustrated in FIG. 2, each water injector 22 is attached to the cylinder head 4 so as to inject the water into the corresponding combustion chamber 6 from a side thereof, and is arranged so that its tip part is oriented toward an inside of the combustion chamber 6 from an inner circumferential surface of the combustion chamber 6.

Further, the water injector 22 is disposed adjacent to the exhaust port 17. In this embodiment, the water injector 22 is disposed immediately below the exhaust port 17. As the water injector 22, for example, an injector for injecting fuel into the cylinder 2, which is used in conventional engines, may be applied, for which description of a specific structure is omitted here. Note that the water injector 22 injects the supercritical water into the cylinder 2 at about 20 MPa, for example.

The supercritical/subcritical water injection into the cylinders 2 is for improving engine performance.

Specifically, by injecting the water into the cylinders 2, the water is able to function as an operation gas to progress expansion stroke. Thus, an amount of fuel supplied to the cylinders 2 is reduced while maintaining the same work amount, i.e., engine output, and fuel efficiency is improved. Further, by injecting the water into the cylinders 2, a large amount of substance which does not contribute in combustion exists in the cylinders 2, and thereby, an ignition delay time becomes longer. Therefore, a more suitable premixed charge compression self-ignition combustion is realized, and thermal efficiency and exhaust emission performance are improved. The supercritical/subcritical water injection into the cylinders 2 is performed, for example, between a medium engine load operating range and a high engine load operating range of the engine body 1. Further, in a low engine load operating range where an exhaust gas temperature is low, Exhaust Gas Recirculation (EGR) gas may be supplied to the cylinders 2, and as the engine load increases, the injection amount of the supercritical/subcritical water may be increased while reducing the EGR gas amount.

Using the supercritical water or the subcritical water as the water injected into the cylinders 2 is to reliably improve the thermal efficiency and fuel efficiency of the engine body 1. Specifically, by injecting the supercritical water or the subcritical water with a higher density than water in a normal gas phase (water vapor), a large amount of water is efficiently introduced into the cylinders compared to injecting the water in the gas phase. Therefore, the amount of gas which remains within the cylinders and progresses the stroke, furthermore an output of the engine body, is efficiently increased. Further, by injecting one of the supercritical water and the subcritical water, which either do not require latent heat at all or require only low latent heat, into the cylinders 2, compared to injecting water in a normal liquid phase, a significant temperature drop inside the cylinders and thermal efficiency degradation which are accompanied by the latent heat are avoided. Therefore, the thermal efficiency is improved.

Figure 3:
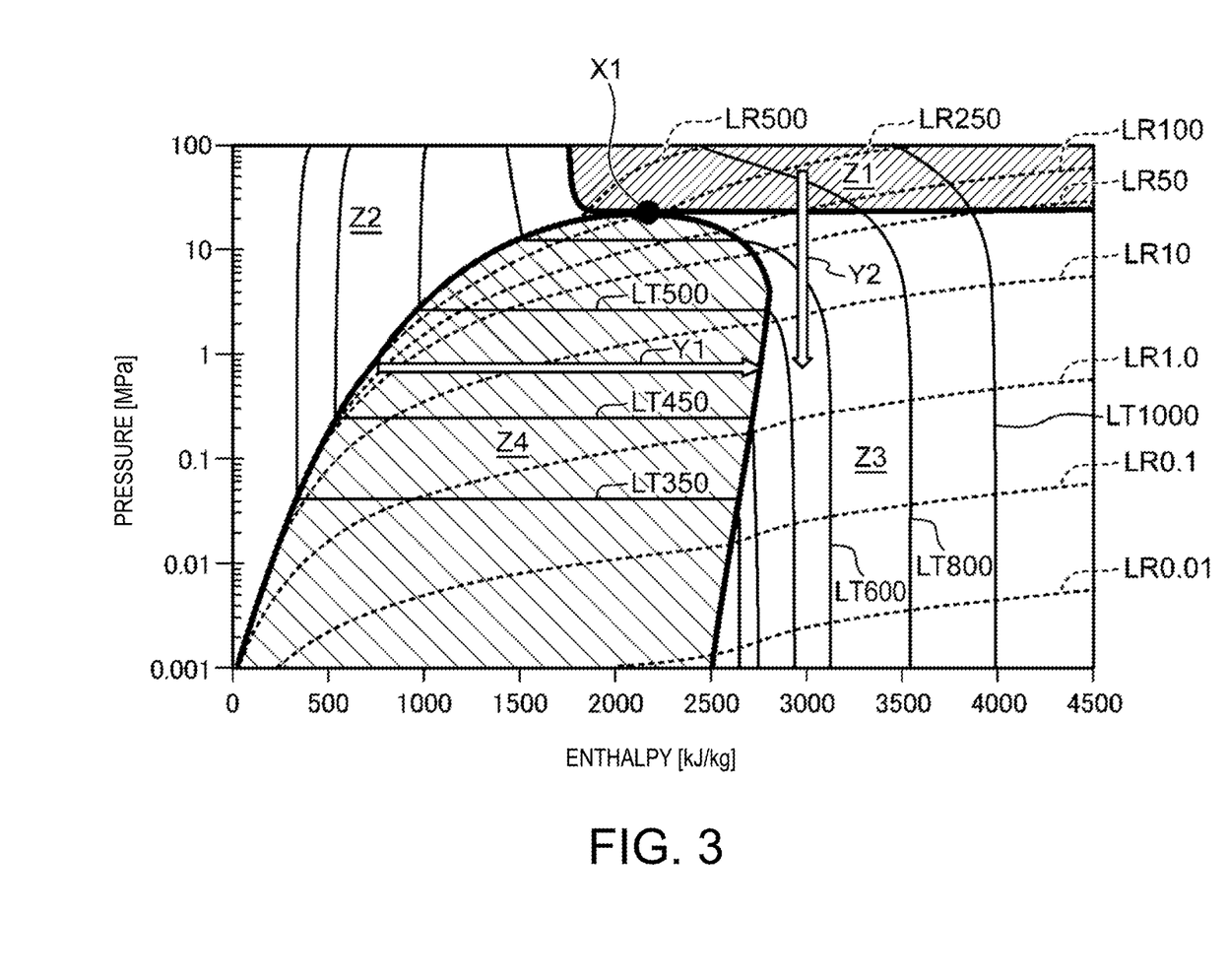
FIG. 3 is a pressure enthalpy diagram for water, illustrating supercritical water.

A specific description regarding this matter is given with reference to FIG. 3 which is a pressure enthalpy diagram for water, of which a horizontal axis indicates enthalpy and a vertical axis indicates pressure. In FIG. 3, an area Z2 is an area of liquid, an area Z3 is an area of gas, and an area Z4 is an area of coexisting liquid and gas. Lines LT350, LT400, . . . , LT1000 indicated by solid lines are isothermal lines, each formed by connecting points of the same temperature. The numerals of the lines indicate temperatures (K). For example, LT350 is an isothermal line of 350 K, and LT1000 is an isothermal line of 1,000 K. Further, a point X1 is the critical point and an area Z1 is an area where a temperature and pressure are higher than the critical point X1, and the supercritical water belongs to this area Z1. Specifically, while the critical point of water is at the temperature of 647.3 K and the pressure of 22.12 MPa, the temperature and pressure of the supercritical water are the same or above, in other words, the temperature is 647.3 K or above and the pressure is 22.12 MPa or above.

In FIG. 3, lines LR0.01, LR0.1, . . . , LR500 indicated by dashed lines are isopycnic lines, each formed by connecting points of the same density. The numerals of the lines indicate densities (kg/m$^3$). For example, LR0.01 is an isopycnic line of 0.01 kg/m$^3$, and LR500 is an isopycnic line of 500 kg/m$^3$.

As is apparent from comparisons of these isopycnic lines LR with the areas Z1 and Z3, the density of the water within the area Z1, in other words, the supercritical water, is about from 50 kg/m$^3$ to 500 kg/m$^3$, which is close to that of water in the liquid phase and much higher than that of water in the gas phase.

Therefore, by injecting the supercritical water with the high density into the cylinders 2, a large amount of water is efficiently introduced into the cylinders compared to injecting the water in the gas phase.

Note that the supercritical water generated by the engine system and injected into the cylinders 2 preferably has a density of 250 kg/m$^3$ or above.

Further, as indicated by the arrow Y1 in FIG. 3, water in a normal liquid phase requires a high enthalpy to change into gas. In other words, the water in the normal liquid phase requires comparatively high latent heat to change into gas. In this regard, as indicated by the arrow Y2, the supercritical water requires almost no enthalpy, in other words, latent heat, to change into water in a normal gas phase.

Therefore, by injecting the supercritical water which does not require latent heat into the cylinders 2, compared to injecting the water in the normal liquid phase, a significant temperature drop inside the cylinders and thermal efficiency degradation which are accompanied by the latent heat are avoided.

Figure 4:
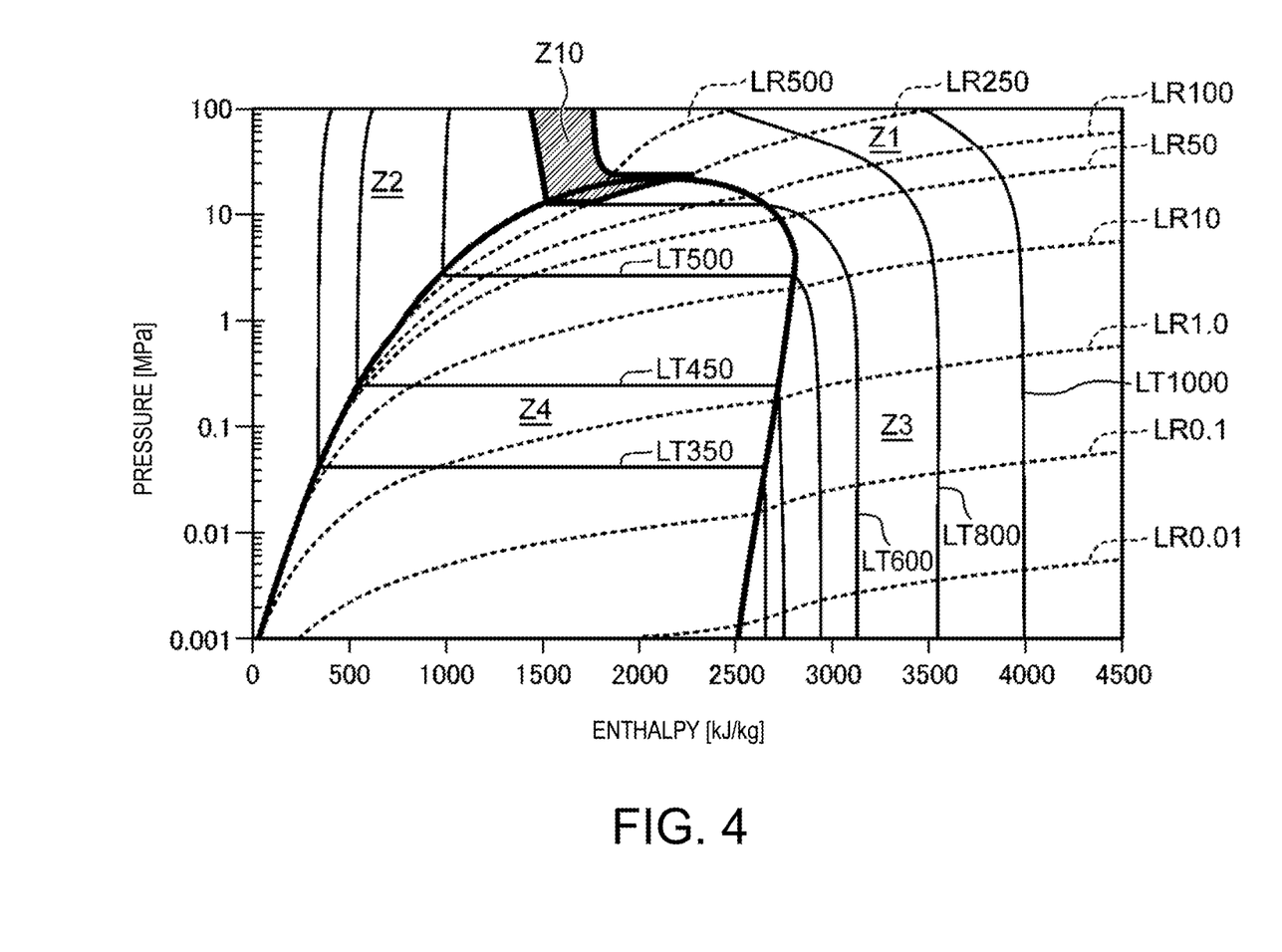
FIG. 4 is a pressure enthalpy diagram for water, illustrating subcritical water.

Here, as is apparent from FIG. 3, water which belongs to an area near the area Z1 has a high density and requires low latent heat to change into gas, which are properties similar to the supercritical water. Therefore, although the supercritical water is injected into the cylinders 2 in this embodiment as described above, instead of the supercritical water, subcritical water which is water belonging to the area near the area Z1 may be generated and injected into the cylinders 2. For example, subcritical water within an area Z10 where the temperature is 600 K or above and the density is 250 kg/m$^3$ or above (see FIG. 4) may be generated and injected.

(2) Intake Passage

The intake passage 30 is provided with an air cleaner 31 and a throttle valve 32 located in this order from an upstream side. The air passes through the air cleaner 31 and the throttle valve 32 and then is introduced into the engine body 1.

The throttle valve 32 opens and closes the intake passage 30. Note that, in this embodiment, while the engine is in operation, the throttle valve 32 is basically kept fully opened or nearly fully opened, and only in a limited operation condition (e.g., the engine is stopped) is the throttle valve 32 closed to block the intake passage 30.

(3) Exhaust Passage

The exhaust passage 40 is provided with, in the following order from its upstream side, a purifying system 41 for purifying the exhaust gas, a heat exchanger (second temperature increasing device) 42, a condenser 43, and an exhaust shutter valve 44. The heat exchanger 42 and the condenser 43 constitute a part of the water circulation device 60. The purifying system 41 comprises, for example, a three-way catalyst.

In this embodiment, as illustrated in FIG. 1 etc., the purifying system 41 and the heat exchanger 42 are accommodated inside a heat accumulation case 49 for heat retention of the purifying system 41 and the heat exchanger 42. The heat accumulation case 49 has a dual tube structure, of which an outer circumferential wall forms a space 49a therein. The space 49a is filled with a heat accumulation agent, and by this heat accumulation agent, the purifying system 41 and the heat exchanger 42 retain heat. In other words, when exhaust gas at high temperature flows into the purifying system 41 etc. located inside the heat accumulation case 49, the heat accumulation agent within the space 49a is warmed up by the exhaust gas, and then the purifying system 41 and the heat exchanger 42 retain heat by the heat accumulation agent. Examples of the heat accumulation agent include a latent heat accumulation agent that melts by being heated and accumulates thermal energy, such as erythritol, and a chemical heat accumulation agent that causes a chemical reaction by being heated and accumulates thermal energy, such as calcium chloride.

The exhaust shutter valve 44 stimulates a recirculation of EGR gas to the intake passage 30.

Specifically, with the engine system of this embodiment, an EGR passage 51 communicating a part of the intake passage 30 downstream of the throttle valve 32 with a part of the exhaust passage 40 upstream of the purifying system 41 is formed, and a portion of the exhaust gas is recirculated to the intake passage 30. Further, the exhaust shutter valve 44 opens and closes the exhaust passage 40. When the EGR is performed and pressure inside the exhaust passage 40 is low, an opening of the exhaust shutter valve 44 is narrowed to increase pressure inside an upstream part of the EGR passage 51 and stimulate the EGR gas recirculation.

The EGR passage 51 is provided with an EGR valve 52 for opening and closing the EGR passage 51, and an amount of the EGR gas recirculated to the intake passage 30 is controlled by adjusting an opening of the EGR valve 52.

Further in this embodiment, the EGR passage 51 is provided with an EGR cooler 53 for cooling the EGR gas passing therethrough, and the EGR gas is recirculated to the intake passage 30 after being cooled by the EGR cooler 53.

The EGR valve 52 is, for example, opened within an engine operating range where the engine load is comparatively low, and the EGR gas is introduced into the cylinder 2 within this range.

(4) Water Circulation Device

The water circulation device 60 generates supercritical water by using thermal energy of the exhaust gas.

The water circulation device 60 includes, in addition to the heat pipes 70, the heat exchanger 42 and the condenser 43, a water supply passage 61 connecting the water injectors 22 with the condenser 43, a water tank (condensed water tank) 62, a low-pressure pump 63, and a high-pressure pump (pump) 64.

The condenser 43 condenses water (water vapor) within the exhaust gas passing through the exhaust passage 40, and the water condensed by the condenser 43 is supplied to the water injectors 22. Thus in this embodiment, the water within the exhaust gas is used as the water injected into the cylinders 2. The water tank 62 stores the condensed water therein. The condensed water generated by the condenser 43 is introduced into the water tank 62 through the water supply passage 61 and stored in the water tank 62.

The low-pressure pump 63 is disposed at a position of the water supply passage 61 between the water tank 62 and the heat exchanger 42, and pumps the condensed water inside the water tank 62 to the heat exchanger 42. The condensed water in the water tank 62 is pumped to the heat exchanger 42 by the low-pressure pump 63.

The heat exchanger 42 exchanges heat between the condensed water pumped by the low-pressure pump 63 and the exhaust gas passing through the exhaust passage 40. The heat exchanger 42 is disposed at a position of the exhaust passage 40 downstream of the purifying system 41, to be adjacent to the purifying system 41.

In this embodiment, a part 61a of the water supply passage 61 is inserted into the exhaust passage 40 to be in contact therewith, and thus, the heat exchanger 42 is formed. In other words, the heat exchanger 42 is formed by the part 61a of the water supply passage 61 and the exhaust passage 40 so that the exhaust gas passes outside the part 61a. Hereinafter, the part of the water supply passage 61 inserted into the exhaust passage 40 is referred to as the heat exchanging passage 61a.

The heat exchanging passage 61a is inserted into a part of the exhaust passage 40 immediately downstream of the purifying system 41. Specifically, the heat exchanging passage 61a is inserted into the exhaust passage 40 located inside the heat accumulation case 49. Therefore in this embodiment, the heat exchanger 42 and the heat exchanging passage 61a, as well as the purifying system 41, retain heat by the heat accumulation case 49.

The condensed water inside the heat exchanging passage 61a is increased in temperature by the exhaust gas passing through the part of the exhaust passage 40 where the heat exchanging passage 61a is inserted. Specifically, if the temperature of the exhaust gas passing through the part of the exhaust passage 40 where the heat exchanging passage 61a is inserted is higher than the temperature of the condensed water inside the heat exchanging passage 61a, the thermal energy is applied to the condensed water from the exhaust gas and the condensed water is increased in temperature. Note that the temperature of the exhaust gas discharged from the engine body 1 is constantly at 100° C.

or above, which is constantly higher than the temperature of the condensed water in the liquid phase. Therefore, the condensed water inside the heat exchanging passage 61a is always increased in temperature by the exhaust gas.

In this embodiment, since the heat exchanging passage 61a is disposed immediately downstream of the purifying system 41 as described above, the condensed water inside the heat exchanging passage 61a also receives reaction heat at the purifying system 41. Thus the condensed water is effectively increased in temperature. Additionally, the condensed water is effectively increased in temperature by the heat retention of the heat exchanging passage 61a by the heat accumulation case 49.

The high-pressure pump 64 pumps the condensed water from the heat exchanger 42 to the water injectors 22. The high-pressure pump 64 is disposed in the water supply passage 61, between the heat exchanger 42 (i.e., the heat exchanging passage 61a) and the heat pipes 70. The high-pressure pump 64 pumps the supercritical water to the water injectors 22 by pressurizing the condensed water increased in temperature by the heat exchanger 42.

Here, the supercritical water after being highly pressurized by the high-pressure pump 64, flows through a part of the water supply passage 61 downstream of the high-pressure pump 64. Therefore, this part is piped for high-pressure use.

As described above, in this embodiment, the supercritical water is basically generated by increasing the condensed water in temperature and pressure by the heat exchanger 42 and the high-pressure pump 64, and is supplied to the water injectors 22.

Note that if the temperature of the exhaust gas discharged from the cylinders 2 is comparatively high, the water inside the water supply passage 61 is increased in temperature by this high-temperature exhaust gas, through the heat pipes 70.

Specifically, each heat pipe 70 exchanges heat between the water pumped from the high-pressure pump 64 and the exhaust gas passing through the exhaust passage 40. The heat pipe 70 increases the temperature of the condensed water only when the temperature of the exhaust gas is above a reference temperature.

Figure 5:
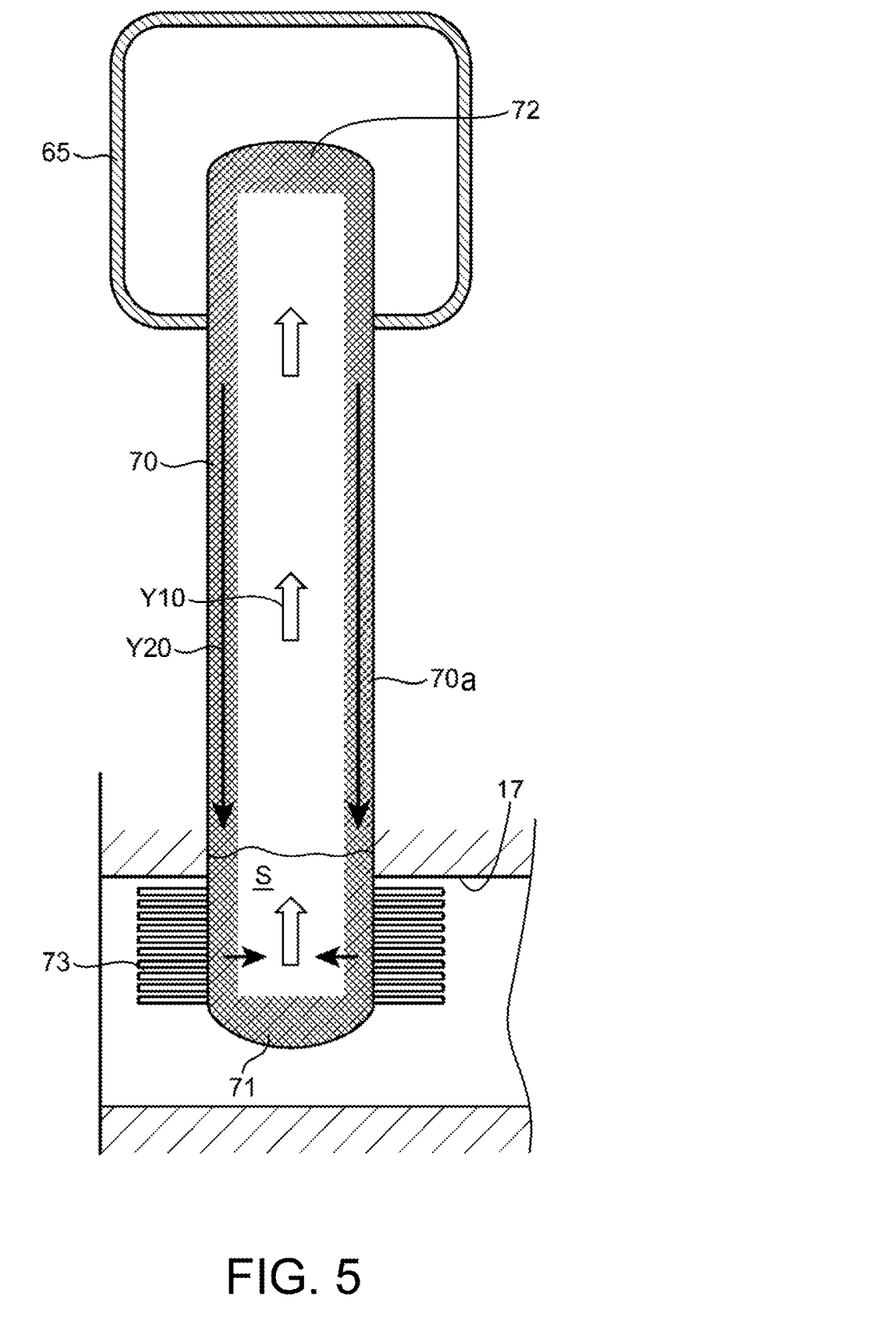
FIG. 5 is a schematic cross-sectional view illustrating an operation of a heat pipe.

In this embodiment, the heat pipe 70 has a substantially circular-column-shaped contour extending in a given direction. FIG. 5 is a schematic cross-sectional view illustrating an operation of the heat pipe 70. As illustrated in this FIG. 5 and also FIG. 2, the heat pipe 70 is arranged so that an end part 71 thereof in its longitudinal directions is inserted into the exhaust port 17 so as to be in contact with the exhaust gas, and the other end part 72 thereof is inserted into the water supply passage 61 so as to be in contact with the water in the water supply passage 61.

As described above with reference to FIGS. 1 and 2, in this embodiment, the heat pipe 70 is inserted into each exhaust port 17. Specifically, a pressure accumulation part 65 extending in the aligned direction of the cylinders 2 is provided to a part of the water supply passage 61 near its downstream end, and independent passages 61b extend toward the water injectors 22, respectively, from the pressure accumulation part 65. Further each exhaust port 17 is provided with one heat pipe 70, and the end parts 71 and 72 of each heat pipe 70 are inserted into the exhaust port 17 and the pressure accumulation part 65, respectively.

In this embodiment, as illustrated in FIG. 2, the pressure accumulation part 65 is disposed near the cylinder head 4, and the heat pipe 70 is built in the cylinder head 4. Specifically, the pressure accumulation part 65 is located above the exhaust ports 17, and the heat pipe 70 extends upward from an inner space of the exhaust port 17 and is inserted into the pressure accumulation part 65. In this embodiment, the end part 71 of the heat pipe 70 on the exhaust port 17 side is provided with a stacked fin 73 formed by stacking metallic plate members in the up-and-down directions, so as to increase the transmitted amount of heat of the exhaust gas in the exhaust port 17 to the end part 71.

As illustrated in FIG. 5, the heat pipe 70 is a pipe member made of a material with high thermal conductivity (e.g., metal), and includes liquid working medium (medium) S therein in a vacuum state. A porous member 70a (e.g., metallic mesh) is provided in an inner wall of the heat pipe 70 to form a capillary structure, a so-called wick.

In the heat pipe 70, the end part 71 inserted into the exhaust port 17 (hereinafter, suitably referred to as "the heat-reception-side end part 71") is warmed up by the exhaust gas and, after exceeding a given temperature, the working medium S vaporizes, and as indicated by the arrow Y10 of FIG. 5, it spreads toward the other end part 72 inserted into the water supply passage 61 (hereinafter, suitably referred to as "the heat-release-side end part 72"). Here, the temperature of the exhaust gas in the exhaust port 17 decreases by applying its thermal energy to the heat pipe 70, i.e., the working medium S. Further the vapor of the working medium S condenses by releasing heat from the heat-release-side end part 72 to the water supply passage 61, and then reverts back to being liquid. Here, the water inside the water supply passage 61 is increased in temperature by receiving the thermal energy from the working medium S. As indicated by the arrow Y20 of FIG. 5, the working medium S, after reverting back to the liquid phase, returns to the heat-reception-side end part 71 due to the capillary action in the porous member 70a, and then retrieves thermal energy from the exhaust gas to change into vapor again. This thermal energy is applied to the water inside the water supply passage 61.

Thus in this embodiment, when the temperature of the exhaust gas becomes high by exceeding the given temperature and the working medium S exceeds its boiling point due to the heat pipe 70, the thermal energy of the exhaust gas in the exhaust port 17 is applied to the water supply passage 61 and the temperature of the water therein is increased.

In this embodiment, the temperature of the exhaust gas at which the heat transfer occurs (reference temperature) is set to about 650 K, and the working medium S corresponding thereto is included in the heat pipe 70. For example, the working medium S is cesium.

(5) Effects

As described above, with the engine system of this embodiment, the heat exchanger 42 and the heat pipes 70 increase the temperature of the water inside the water supply passage 61 by using the thermal energy of the exhaust gas, so as to generate the supercritical water. The supercritical water is injected into the cylinders 2. Therefore, it is possible to convert the energy of the exhaust gas into the output of the engine body 1 via the water, which improves the energy efficiency of the engine system as a whole.

Especially with this engine system, since the water inside the water supply passage 61 is substantially constantly increased in temperature by the heat exchanger 42, the energy of the exhaust gas is stably applied to the water, which improves the energy efficiency more reliably. Further since the heat exchanger 42 is disposed immediately downstream of the purifying system 41, it is possible to effectively supply the reaction heat at the purifying system 41 to the water inside the water supply passage 61. Moreover, the heat exchanger 42 and the purifying system 41 are heat retained by the heat accumulation agent accommodated in the heat accumulation case 49. Also by this, it is possible to effectively increase the temperature of the water and suppress the temperature variation of the purifying system 41.

With this engine system, each heat pipe 70 for exchanging heat between the exhaust gas and water only when the exhaust gas temperature is above the reference temperature is disposed in the part of the exhaust port 17 which is located closer to the cylinder 2 than the purifying system 41 and the heat exchanger 42 and where the exhaust gas temperature is particularly high in the exhaust port 17. Therefore, when the exhaust gas at high temperature, which is above the reference temperature, is discharged from the cylinder 2, it is possible to effectively increase the temperature of the water inside the water supply passage 61 by the heat pipe 70, using high thermal energy of the exhaust gas. Additionally, when the high-temperature exhaust gas is discharged from the cylinder 2 as above, the exhaust gas temperature at the exhaust port 17 is reduced by applying the thermal energy of the exhaust gas to the water inside the water supply passage 61. Thus, it is prevented that the high-temperature exhaust gas flows into the purifying system 41. On the other hand, when the temperature of the exhaust gas discharged from the cylinder 2 is comparatively low, the heat exchange at the heat pipe 70 is stopped and the temperature of the exhaust gas is not decreased. Therefore, an excessive temperature decrease of the exhaust gas which flows into the purifying system 41 is also prevented. Thus, with this engine system, the temperature of the purifying system 41 is kept within a suitable range while increasing the temperature of the water inside the water supply passage 61 by effectively using the energy of the exhaust gas.

Especially with this engine system, the temperature of the exhaust gas before the heat exchange by the heat pipes 70 is started is set to be about 650 K. Therefore, supercritical water is generated from the water inside the water supply passage 61 more reliably while suitably controlling the temperature decrease of the purifying system 41.

Further the engine system is provided with the high-pressure pump 64 for pressurizing the water inside the water supply passage 61. Therefore, the heat exchanger 42 and the high-pressure pump 64 are capable of generating the supercritical water. Additionally, the high-pressure pump 64 is provided downstream of the heat exchanger 42, near the cylinders 2. Thus, it is possible to shorten the length of the piping for high pressure use, where the supercritical water at high pressure flows. This is advantageous in cost.

Further the engine system is provided with the condenser 43 in the exhaust passage 40, and the water within the exhaust gas is condensed by the condenser 43 and supplied to the water injectors 22. In other words, the water within the exhaust gas is used as the water injected into the cylinders 2 by the water injectors 22. Therefore, there is no need to separately prepare water for the injection, which improves convenience.

Further in the engine system, the condenser 43 is provided at the position of the exhaust passage 40 downstream of the heat exchanger 42. The exhaust gas, after being decreased in temperature by the thermal energy application to the water at the heat exchanger 42, flows into the condenser 43. Therefore, it is possible to efficiently condense the water by the condenser 43.

Further the engine system stores in the water tank 62 the water condensed by the condenser 43, and this water is pumped to the water injectors 22 side by the low-pressure pump 63. It is possible to inject the suitable amount of water into the cylinders 2. Additionally, here, since the pressure is increased above a saturated vapor pressure of water of which temperature is increased by the heat exchanger 42, it is possible to reduce cavitation in the water.

(6) Modifications

In this embodiment, the case where the supercritical water (i.e., water) is injected into the cylinders 2 is described; however, as described above, instead of the supercritical water, subcritical water which has properties similar to the supercritical water may be injected into the cylinders 2. Also in this case, since the density is higher than normal water and required latent heat is extremely low, the ignition delay time is extended.

Further the specific structure of the heat pipes 70 is not limited to the above example.

Further the working medium S of the heat pipes 70 is not limited to cesium. Moreover, the temperature to start the heat exchange between the exhaust gas and water at the heat pipe 70 is not limited to 650 K. Note that, by setting this starting temperature to 600 K or above, for example between 600 and 700 K, the supercritical water is generated more reliably, and the purifying system 41 is kept at a more suitable temperature.

Further in this embodiment, the case where the heat accumulation case 49 having the dual tube structure is provided, the outer circumferential wall of the heat accumulation case 49 accommodates the heat accumulation agent, and the purifying system 41 is disposed inside the heat accumulation case 49 is described; however, the heat accumulation agent may directly be covered by the purifying system 41.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

LIST OF REFERENCE CHARACTERS

1 Engine Body
2 Cylinder
17 Exhaust Port (Exhaust Flow Part)
21 Fuel Injector
22 Water Injector
40 Exhaust Passage (Exhaust Flow Part)
41 Purifying System
42 Heat Exchanger (Second Temperature Increasing Device)
43 Condenser
61 Water Supply Passage
70 Heat Pipe (First Temperature Increasing Device)
S Working Medium (Medium)

What is claimed is:

1. An engine system including a cylinder, an exhaust flow part where exhaust gas generated within the cylinder flows, and a purifying system provided to the exhaust flow part and for purifying the exhaust gas, comprising:
    a water injector for injecting one of supercritical water and subcritical water into the cylinder;
    a water supply passage connected with the water injector and for supplying the one of the supercritical water and the subcritical water to the water injector;
    a first temperature increasing device disposed at a position of the exhaust flow part and for increasing a temperature of water inside the water supply passage by using energy of the exhaust gas; and a second temperature increasing device including a part of the exhaust flow part and a part of the water supply passage, and for increasing a temperature of the water inside the water supply passage by using energy of the exhaust gas, wherein the first temperature increasing device increases the temperature of the water inside the water supply passage when a temperature of the exhaust gas passing through the position of the exhaust flow part exceeds a reference temperature, the position of the first temperature increasing device being closer to the cylinder than the purifying system and the second temperature increasing device, and wherein the second temperature increasing device increases the temperature of the water inside the water supply passage when a temperature of the exhaust gas passing through the part of the exhaust flow part is above a temperature of the water passing through the part of the water supply passage.

2. The system of claim 1, wherein the first temperature increasing device is a heat pipe accommodating a medium of which a boiling point is close to the reference temperature, and increases the temperature of the water inside the water supply passage via the medium.

3. The system of claim 1, wherein the reference temperature is 600 K or above.

4. The system of claim 1, further comprising a pump provided at a position of the water supply passage downstream of the second temperature increasing device, and for pumping water passing therethrough.

5. The system of claim 1, further comprising a condenser provided at a position of the exhaust flow part downstream of the second temperature increasing device, and for condensing water within the exhaust gas in the exhaust flow part, wherein the water supply passage supplies the water condensed by the condenser to the water injector.

6. The system of claim 5, further comprising a condensed water tank provided at a position of the water supply passage between the second temperature increasing device and the condenser, and for storing the condensed water; and a low-pressure pump provided at a position of the water supply passage between the condensed water tank and the second temperature increasing device, and for pumping the water inside the condensed tank to the second temperature increasing device.

7. The system of claim 1, wherein the purifying system is disposed at a position of the exhaust flow part upstream of the second temperature increasing device, so as to be adjacent thereto, and wherein the purifying system is covered by a heat accumulation agent.

* * * * *